Feb. 13, 1973 C. J. VAN ELK ET AL 3,716,780

SYSTEM FOR THE ACCURATE REPRODUCTION OF PULSE CODE MODULATION SIGNALS RECEIVED AS AN UNFAVOURABLE SIGNAL-TO-NOISE RATIO

Filed April 5, 1971 5 Sheets-Sheet 1

INVENTORS
CORNELIS J. VAN ELK
JACOB F. RAATGEVER
ALBERTUS M. MORRIEN
BY JAN G.D. VAN DER LEE

Frank R. Trifari

AGENT

SYSTEM FOR THE ACCURATE REPRODUCTION OF PULSE CODE MODULATION SIGNALS RECEIVED AS AN UNFAVOURABLE SIGNAL-TO-NOISE RATIO

Filed April 5, 1971

INVENTORS
CORNELIS J. VAN ELK
JACOB F. RAATGEVER
ALBERTUS M. MORRIEN
JAN G.D. VAN DER LEE
BY [signature]
AGENT INVENTORS
CORNELIS J. VAN ELK
JACOB F. RAATGEVER
ALBERTUS M. MORRIEN
BY JAN G.D. VAN DER LEE
AGENT INVENTORS
CORNELIS J. VAN ELK
JACOB F. RAATGEVER
ALBERTUS M. MORRIEN
JAN G.D. VAN DER LEE
BY
AGENT INVENTORS
CORNELIS J. VAN ELK
JACOB F. RAATGEVER
ALBERTUS M. MORRIEN
JAN G.D. VAN DER LEE
BY
AGENT United States Patent Office 3,716,780
Patented Feb. 13, 1973

3,716,780

SYSTEM FOR THE ACCURATE REPRODUCTION OF PULSE CODE MODULATION SIGNALS RECEIVED AS AN UNFAVOURABLE SIGNAL-TO-NOISE RATIO

Cornelis Johannes van Elk, Jacob Frederik Raatgever, Albertus Marinus Morrien, Jan Gijsbert, and Dirk van der Lee, Hilversum, Netherlands, assignors to U.S. Philips Corporation, New York, N.Y.

Filed Apr. 5, 1971, Ser. No. 131,150
Claims priority, application Netherlands, Apr. 4, 1970, 7004875
Int. Cl. H04b *1/12*
U.S. Cl. 325—324 7 Claims

ABSTRACT OF THE DISCLOSURE

A system for the accurate reproduction of pulse code modulation signals received at an unfavourable signal-to-noise ratio, comprising two signal integrators controlled by clock pulses and a detection circuit connected thereto, which together form part of a first control loop for phase readjustment of the clock pulse generator and a second control loop for rendering the reference level required for detection of the transitions and the direct voltage level of the incoming signal equal to each other.

The invention relates to a system for accurate reproduction of pulse code modulated (PCM) signals received at an unfavourable signal-to-noise ratio, comprising a controllable clock pulse generator and a plurality of integrators for integrating said noisy input signal over a period determined by the output pulses from said clock pulse generator, a source of reference potential and detection circuit means responsively connected to said integrators, and to said source of reference potential for generating a signal indicative of the transitions in said input signal, said integrators combined with said detection circuit means forming part of a control loop for phase control of the clock pulse generator.

In systems of the type described above the incoming pulses do not have very steep edges and have a varying base level which is known to be typical of pulse signals whose DC and LF components are suppressed as a result of the high-pass characteristic of inductively or capacitively coupled transmitter stages and/or the high-pass characteristic of the transmission path. Due to said varying properties of the incoming pulses and particularly due to their varying base level, vary stringent requirements are imposed on detection and regeneration. The use of the known clamping circuits for restoring a DC level and the arrangements including feedback circuits also known for this purpose do not provide a solution in this case, because these known means are insufficiently effective as soon as the properties of the pulses deviate from those for which these arrangements have been designed.

A further known method applies the signals obtained after full-wave rectification of the integrated signals to a mean value detector to produce an output signal which may be used as a reference level following the varying base level of the incoming pulses. This method is, however, found to have the serious drawback that the reference level provided by the mean value detector, varies relatively strongly with the received noise, so that an accurate and reliable detection and regeneration is not possible in case of unfavourable signal-to-noise ratios.

An object of the present invention is to provide a system of the kind described in the preamble in which the aforementioned difficulties with respect to the reference level are avoided and in which in addition the phase correction signal is generated simultaneously in a very elegant manner so that an optimum detection and regeneration is realised even in case of unfavourable signal-to-noise ratio.

According to the invention, such a system is furthermore provided with a controllable direct voltage source, while said integrators and said detection circuit means which together form part of said phase control loop also form part of a second control loop which is adapted to readjust said controllable direct voltage source, so as to thereby render said reference level and the varying direct voltage level of the input signal equal to each other.

When using the steps according to the invention a particularly favourable operation is obtained also due to the fact that errors in the correction signals due to noise can be eliminated in a simple manner by correct proportioning of the control loops.

In order that the invention may be readily carried into effect, a possible embodiment thereof will now be described in detail, by way of example with reference to the accompanying diagrammatic drawings, in which:

FIG. 3 shows a possible embodiment of the detection circuit used in the system, while

Figure 2:
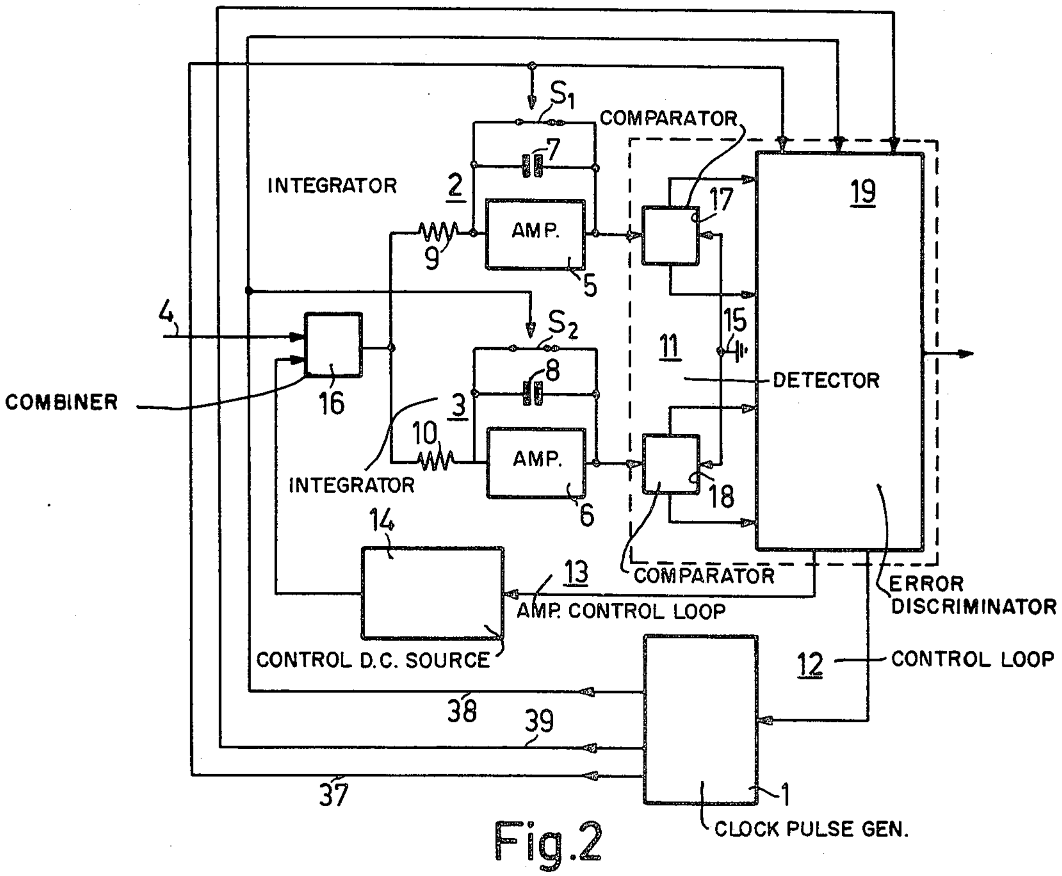
FIG. 2 shows a possible embodiment of the system according to the invention.
Figure 3:
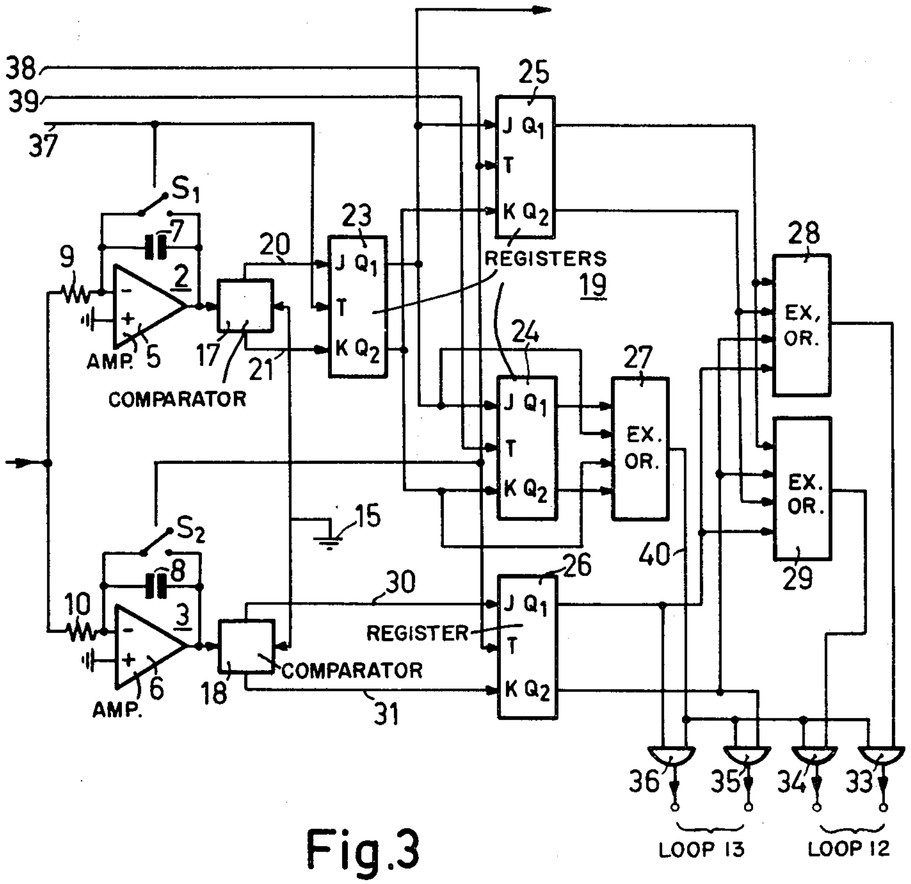

Like parts are denoted by like reference numerals in FIGS. 2 and 3.

Figure 1:
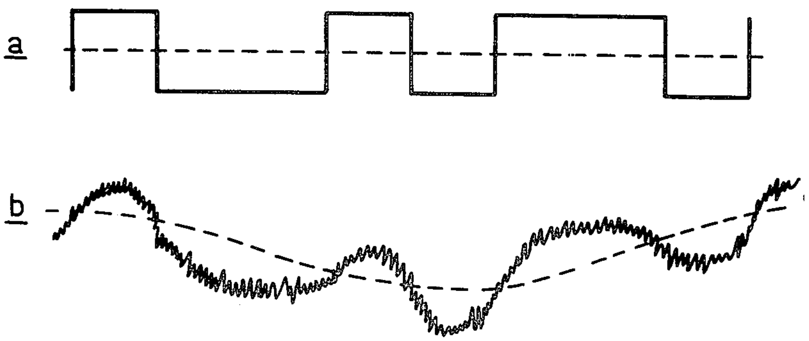
FIG. 1 shows a transmitted and a received PCM video signal.

As shown in FIG. 1*a*, a transmitted PCM video signal comprises a plurality of square wave pulses whose presence or absence signifies a binary ONE or ZERO. The signal coming in at the receiver end is affected, as shown in FIG. 1*b*, by varying amounts of noise including white noise high energy components of LF noise.

The system shown in a block diagram in FIG. 2 has the function to regenerate from the incoming signal (FIG. 1*b*), a clean PCM signal as an accurate reproduction of the originally transmitted PCM video signal (FIG. 1*a*) and a synchronized local clock signal. To this end the system according to FIG. 2 is provided with a controllable clock pulse generator 1 and two fast integrators 2 and 3 controlled by output pulses from this clock pulse generator. The PCM video signal coming in at 4 is applied to these integrators, which are each formed by an operational amplifier 5, 6 provided with an integrating capacitor 7, 8 connected between its input and output terminals. The incoming PCM video-pulse train is connected to the amplifier input terminals through input resistors 9 and 10, respectively. The integrating capacitors 7 and 8 are each shunted by switches $S_1$ and $S_2$, respectively. In practice these switches will normally be high speed electronic switches, since PCM repetition rates of one million bits per second are not unusual in contemporary telemetry systems. Switches $S_1$ and $S_2$ are operated by output pulses from the clock pulse generator 1, so that the integration periods of the integrators overlap each other and the duration of these integration periods is equal to the duration of one bit period, as will be further described hereinafter.

Furthermore the system shown is provided with a detection circuit 11 coupled to the integrators 2, 3 which circuit determines the occurrence of zero crossings while using a reference level. In addition, these integrators 2, 3 combined with the detection circuit 11 form part of a control loop 12 for phase readjustment of the clock pulse generator 1.

According to the invention a particularly favourable and altogether advantageous system is obtained if the system is furthermore provided with a controllable direct voltage source 14, and if said integrators 2, 3 and said detection circuit 11, which together form part of the phase control loop 12, also form part of a second control loop 13 which is adapted to readjust said controllable direct voltage source 14, so as to thereby render said reference level and the varying direct voltage, level of the received signals equal to each other.

In the embodiment shown in FIG. 2, the said reference level is derived from a point 15 of fixed potential (for example, earth) and in order to be able to render the varying direct voltage level of the incoming signal equal to this reference level the system is provided with a combination device 16 which constitutes the input circuit of the integrators 2, 3 and in which the incoming signal is combined with the output voltage of said controllable direct voltage source 14.

In the embodiment of the detection circuit 11 shown in greater detail in FIG. 3, this circuit comprises two comparison devices 17 and 18 and an error discriminator 19 which is built up from logic elements as is shown in the figure. In the embodiment shown this error discriminator comprises four registers 23 to 26, three "exclusive OR" circuits 27, 28 and 29 and four AND gates 33 to 36. Each register is formed by a bistable element with inputs T, J and K and outputs $Q_1$ and $Q_2$. The comparison devices 17 and 18 are connected to the outputs of integrators 2 and 3, respectively, and in the embodiment shown they are furthermore connected to the said point of fixed potential 15 which provides the reference level. The level of the integrated signals is compared in these comparison devices with the said reference level, whereby a voltage occurs through lines 20 and 30 at the input J of registers 23 and 26, respectively, when the output level of the relevant integrators 2 and 3 is higher than the reference level, whereas a voltage occurs at the input K of registers 23 and 26 through lines 21 and 31, respectively, when the output level of the relevant integrators 2 and 3 is lower than the reference level. The two integrators 2 and 3 and the registers 23 to 26 are controlled by clock pulses which are generated in the clock pulse generator 1. To this end this clock pulse generator is formed in such a manner that it can provide the series of clock pulses shown in FIGS. 4*a*, 4*b* and 4*c*. As is shown in these figures, a fixed time relation exists among these different clock pulse series. Thus, the pulse repetition frequencies of these pulse series are mutually equal and have been chosen to be such that one repetition period is equal to one bit period of the incoming signal. The clock pulse generator is controlled in frequency and phase in a manner such that the pulses of the pulse series shown in FIG. 4*a* accurately coincide with the transitions of the incoming data signal shown in an idealized form in FIG. 4*d*. These clock pulses are applied via line 37 to the input T of register 23 and also to the integrator 2 for operating switch $S_1$. The pulses of the pulse series shown in FIG. 4*b* are phase shifted over half a bit period relative to the pulse series shown in FIG. 4*a*, so that these pulses coincide with the centre of successive bit periods. These pulses are applied through line 38 to the input T of registers 25 and 26 and also to the integrator 3 for operating switch $S_2$. The pulses of the pulse series shown in FIG. 4*c* are phase shifted over a small angle $\Delta$ relative to the pulse series shown in FIG. 4*a* and are applied through line 39 to the input T of register 24.

Figure 4:
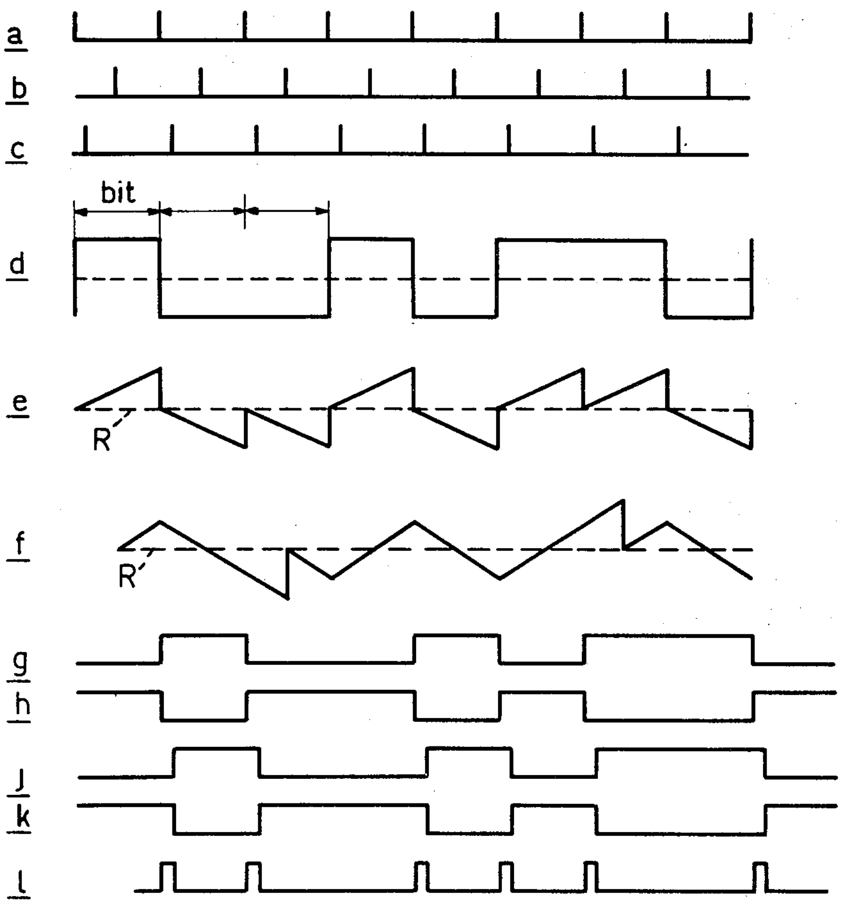
FIGS. 4, 5 and 6 show diagrams for explaining the operation of the system.

The diagrams shown in FIG. 4 illustrate the desired condition when the direct voltage level of the incoming signal is accurately aligned to the fixed reference level and the clock pulses of FIG. 4*a* accurately coincide with the transitions of the signal of FIG. 4*d* applied to the integrator 2. These transitions are detected in the detection circuit superimposed on the level of the integrated signal occurring at the output of integrator 2, which signal is shown in FIG. 4*e*. The integrator is active during every full period. The integrated value of each bit period is compared in the comparison device 17 with the fixed reference level 15, a voltage occurring either at the input J or at the input K of register 23 dependent on whether the integrated value is either higher or lower than the reference value which is denoted by the reference R in the figure. The clock pulse coinciding with the end of each period is applied through line 37 to the input T of register 23 and produces voltages at the outputs $Q_1$ and $Q_2$ of register 23 which voltages are representative of either a registered "1" and "0" value, or a "0" and "1" value depending upon the voltages occurring at its inputs J and K. The clock pulse which brings about this registration in the register 23 is also applied to the integrator 2, where it causes the integration capacitor 7 to be discharged immediately after registering through the switch $S_1$ which is closed for a short period by this clock pulse. The integrator 2 is subsequently ready for integrating the next bit period. The regenerated original data signal is then produced at the output $Q_1$ of register 23. This signal and the signal occurring at the output $Q_2$ of register 23 are shown in FIGS. 4*g* and 4*h*, respectively. These figures clearly show that these output signals are alternately representative of a registered "1" and a registered "0" value, respectively, and that such a change of state always takes place at a transition of the signal. These transitions are then indicated by transition pulses which, starting from the changes of state of register 23, are generated with the aid of register 24, and the "exclusive OR" circuit 27, which on the one hand is connected to the $Q_1$ outputs and on the other hand is connected to the $Q_2$ outputs of registers 23 and 24. Register 24 takes over the "1" and "0" values registered in register 23 at the instance when a clock pulse of the clock pulse series shown in FIG. 4*c* occurs through line 39 at the input T of register 24. Since these clock pulses are shifted in phase over an angle $\Delta$ relative to the clock pulses of FIG. 4*a* applied to register 23, the output signals of $Q_1$ and $Q_2$ of register 24 shown in FIGS. 4*j* and 4*k* also exhibit a phase shift $\Delta$ relative to the output signals of $Q_1$ and $Q_2$ of register 23. The exclusive OR circuit 27 thus provides the output pulses shown in FIG. 4*l* the duration of which pulses is determined by the period $\Delta$ during which only one of the said $Q_1$ outputs or one of the said $Q_2$ outputs provides an output voltage. Each of these output pulses is representative of a transition and is applied through the output line 40 to the AND gates 33, 34, 35 and 36.

Figure 5:
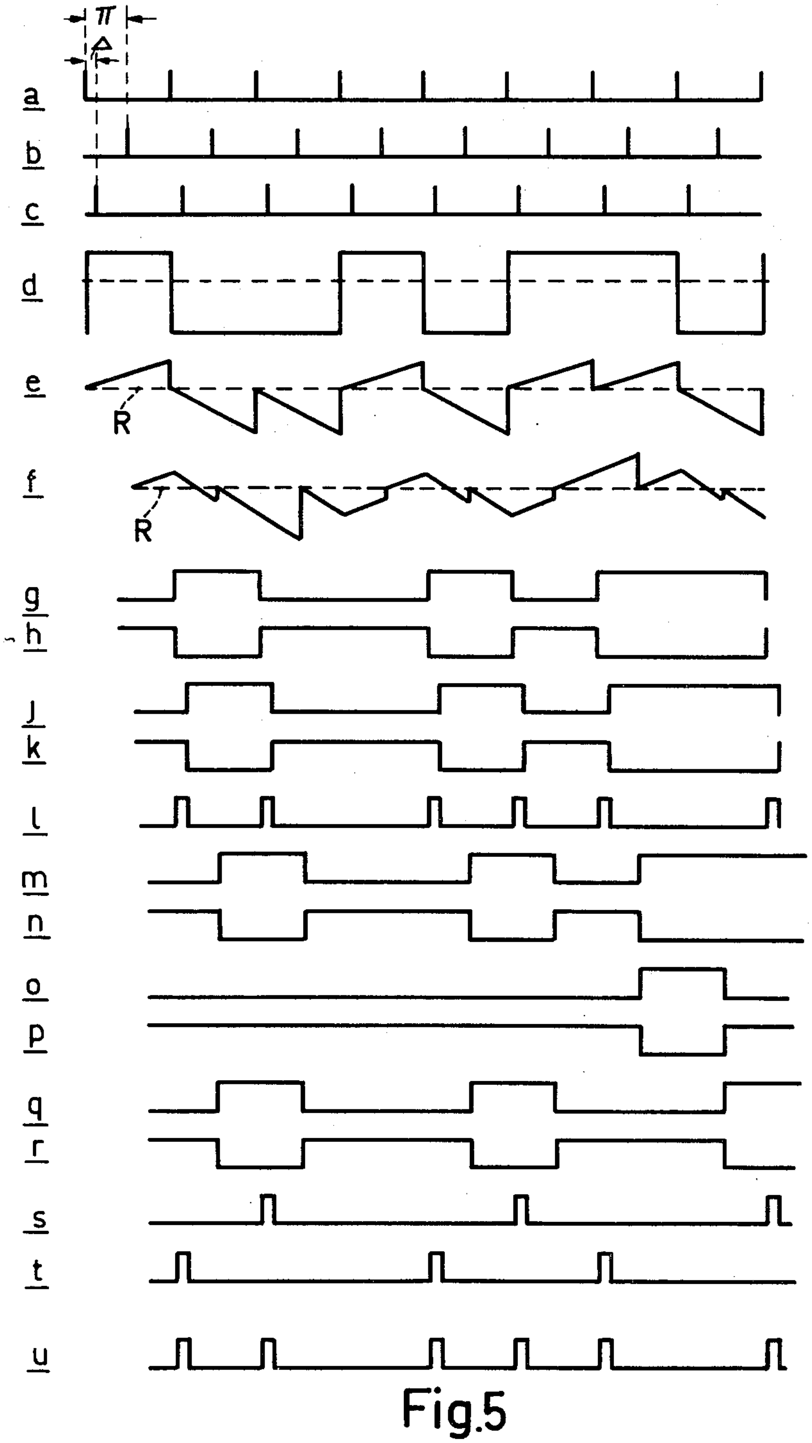
Figure 6:
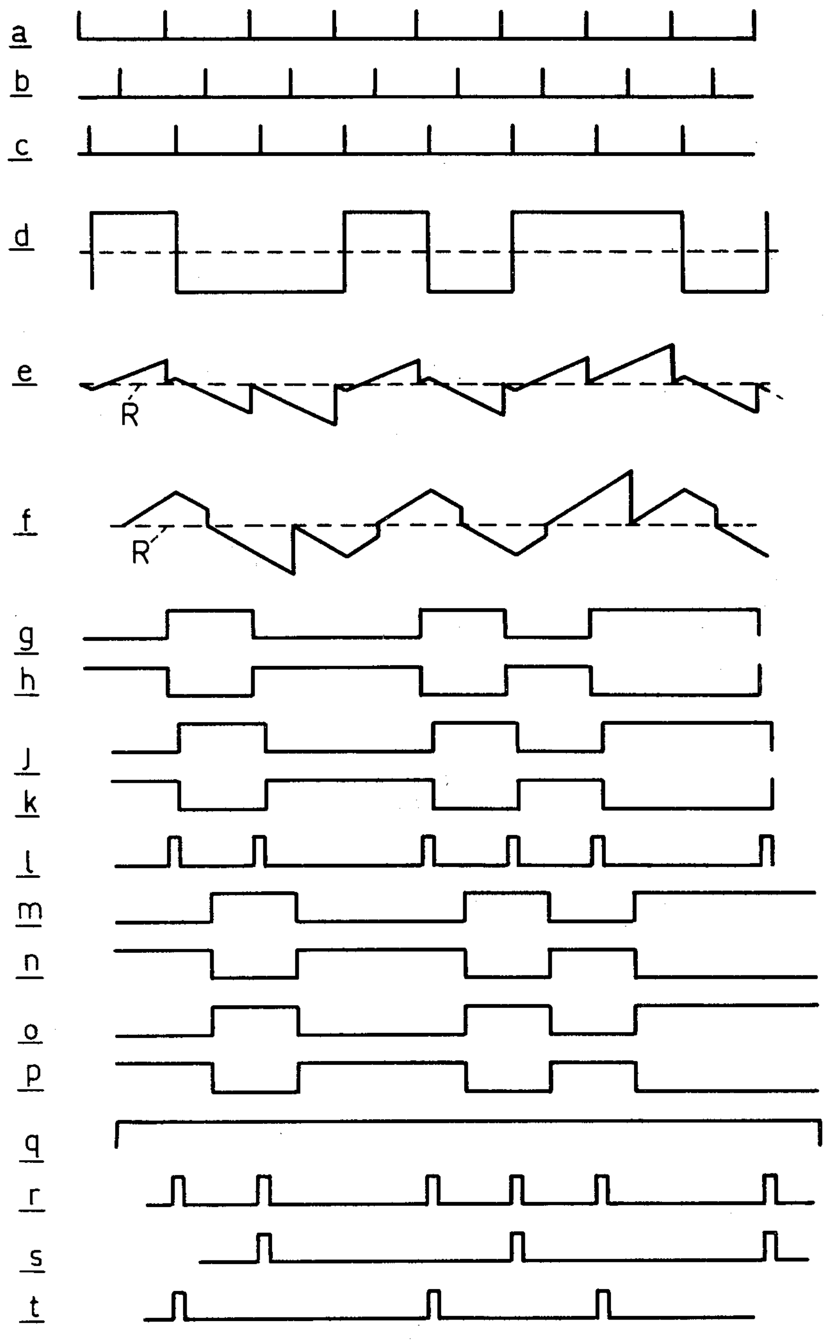

These AND gates are controlled in dependence upon a possibly occurring phase error and/or direct voltage level error. The occurrence of such an error is determined on the ground of the integrated signal occurring at the output of integrator 3, which signal is shown in FIG. 4*f*. This integrator is controlled by the clock pulses shown in FIG. 4*b* which pulses coincide every time with the centre of a bit period. The integrated value of each integration period is compared in the comparison device 18 with the fixed reference level 15 whereby a voltage occurs either at the input J or at the input K of register 26 dependent on whether the integrated value is higher or lower than the reference level. The clock pulse coinciding with the end of each integration period is applied through line 38 to the input T of register 26, and causes the voltages at the outputs $Q_1$ or $Q_2$ of register 26, dependent on the voltages occurring at the instant at its inputs J and K, to become representative of either a registered "1" and "0" or a "0" and "1" value. The clock pulse which brings about this registering in the register 26 is also applied to integrator 3 where it causes the integrating capacitor 8 to be discharged immediately after registering through the switch $S_2$ which is closed for a short period by this clock pulse. The integrator 3 is then ready for the next integration period. A further consideration of the integrated signal of FIG. 4*f* shows that the integrated value at the instants determined by the clock pulses of FIG. 4*b* is equal to the reference level R and that the comparison device therefore does not provide any output voltage at the registering instants which is correct for the state shown in FIG. 4, because as assumed both the direct current level and the phase are correct and thus the positive and negative charges of the integrating capacitor 8 during an integration period cancel each other. Consequently, the comparison device will provide an output voltage when the adjustment of the direct voltage level and/or the phase is faulty, because in that case the said positive and negative charges are no longer equal to each other. For the purpose of illustration reference is made to FIGS. 5 and 6 showng the same diagrams as those in FIG. 4 but different in that FIG. 5 shows these diagrams in the case of an incorrect adjustment of the direct voltage level, while FIG. 6 shows these diagrams in the case of a phase error occurring. More particularly FIGS. 5*f* and 6*f* showing the variation of the integrated signal occurring at the output of integrator 3, are interesting in that they clearly show that the integrated value at the registering instants determined by the clock pulses of FIGS. 5*b* and 6*b* exhibit a certain deviation relative to the reference level R both in the case of a direct voltage level error and in the case of a phase error. This deviation is found in the comparison device 18 and results in the register 26 being written in at the instants of registering so that either $Q_1$ or $Q_2$ of register 26 provides an output voltage dependent on the polarity of the deviation found. Each deviation found may be the result of a phase error, a direct voltage error or both and as such it has no distinctive criterion at all. Nevertheless it is achieved in a very elegant manner in the system according to the invention that the control of the two control circuits is independent of each other. To this end the fact is used as a distinctive criterion that the polarity of the deviation found in the case of a direct voltage level error remains equal at successive registering instants while the deviation found in the case of a phase error changes its polarity at successive registering instants. More particularly FIG. 5*f* shows that the deviation relative to the reference level R at the instants of registering every time has a negative polarity if the direct voltage level is too high. For the case where the direct voltage level is too low (not shown) the deviation relative to the reference level R every time has a positive polarity.

FIG. 6*f* shows that in the case of clock pulses lagging in phase relative to the transitions the deviation relative to the reference level R changes its polarity at successive instants of registering and this in a manner such that the deviation is positive when the incoming signal goes through a transition from positive to negative whereas it is negative for the next transition from negative to positive. Conversely, for the case where the clock pulses are leading in phase relative to the transitions that is to say, when the incoming signal goes through a transition from positive to negative, the deviation is negative whereas it is positive for the next transition going from negatve to positive.

Starting from the above-mentioned criteria the normally closed AND gates 36 and 35 shown in the embodiment of FIG. 3 are directly controlled by the signals occurring at the outputs $Q_1$ and $Q_2$ of register 26, the control signal occurring at the output $Q_1$ enables AND gate 36 as long as the direct voltage level is too low whereas the control signal occurring at the output $Q_2$ enables AND gate 35 as long as the direct voltage level is too high. If the direct voltage level has the desired value, but is not yet correct in phase, the AND gates 35 and 36 are enabled alternately. Starting from the said criteria two control signals are furthermore generated for the purpose of controlling the normally closed AND gates 33 and 34. To this end the "1" and "0" values stored in register 23 are taken over in register 25 at the instant register 26 is operated. The signals occurring at the outputs $Q_1$ and $Q_2$ of registers 25 and 26 are selected with the aid of the "exclusive OR" circuits 28 and 29 in such a manner that the control signal occurring at the output of the "exclusive OR" circuit 29 enables AND gate 34 as long as the clock pulses lag in phase relative to the transitions and that the control signal occurring at the output of the "exclusive OR" circuit 28 enables AND gate 33 as long as the clock pulses lead in phase relative to the transitions. If the phase is correct, but the direct voltage level has not yet the desired value, the gates 33 and 34 are enabled alternately.

The AND gates 33, 34 and 35, 36 constituting the outputs of the error discriminator 19 are connected through line 40 to the transition pulse output of register 27, and these gates pass the applied transition pulses in dependence upon the error to be corrected. Each of the transition pulses passed by gate 33 causes the clock pulses produced by the clock pulse generator to be phase-shifted one step backward while each transition pulse passed by gate 34 cause the clock pulses to be phase-shifted one step forward. When the gates 33 and 34 are enabled alternately to pass a transition pulse the mean phase remains constant. Likewise each of the transition pulses passed by the gates 35 and 36 causes the direct voltage provided by the controllable direct voltage source 14 to be increased or decreased in level by one step. To this end the controllable direct voltage source 14 is preferably constitutd by a bidirectional counter whose output circuit is constituted by a digital-to-analog converter.

To illustrate the operation described above further reference is made to FIG. 5 which relates to the case where the direct voltage level is higher than the desired value and to FIG. 6 which relates to the case where the clock pulses lag in phase relative to the zero crossings. Thus the signals occurring at the outputs $Q_1$ and $Q_2$ of register 25 are shown in FIGS. 5*m* and 5*n* and the signals occurring at the outputs $Q_1$ and $Q_2$ of register 26 are shown in FIG. 5*o* and FIG. 5*p*. The last-mentioned signals are applied as control signals to the AND gates 35 and 36, respectively, so that gate 36 remains closed whereas gate 35 is enabled to pass the transition pulses shown in FIG. 5*u* for the purpose of correcting the direct voltage level.

The signals shown in FIGS. 5*m, n, o* and *p* are also applied to both exclusive OR circuits 29 and 28 which in response thereto produce the control signals shown in FIGS. 5*q* and 5*r* respectively. These control signals being applied to the AND gates 33 and 34 respectively, enable AND gate 33 to pass the transition pulses shown in FIG. 5*t* and enable AND gate 34 to pass the transition pulses shown in FIG. 5*s*. As illustrated by FIG. 5, the AND gates 33 and 34 are enabled alternately; hence, the phase control has the attractive feature that it always tends to reduce the phase error to zero. In the case where the clock pulses lag in phase as is shown in FIG. 6, the signals occurring at the outputs $Q_1$ and $Q_2$ of registers 25 and 26 have the shape shown in FIGS. 6*m, n, o* and *p*, respectively. Though these signals are applied to both exclusive OR circuits 29 and 28, a control signal (FIG. 6*q*) is produced by exclusive OR circuit 28 only. This control signal enables AND gate 33 to pass the transition pulses shown in FIG. 6*r* which are required for correcting the phase error. The signals shown in FIGS. 6*o* and *p* are also used as control signals. Being applied to AND gates 35 and 36 respectively, AND gate 35 is enabled to pass the transition pulses shown in FIG. 6*t*, and AND gate 36 is enabled to pass the transition pulses shown in FIG. 6s. As is apparent from FIG. 6 the gates 35 and 36 are enabled alternately; hence, the direct voltage level control, like the phase control has the feature that it always tends to reduce the error to zero.

Together with this important property of the two control circuits and their mutual independence already mentioned hereinbefore, the system according to the invention additionally has the special advantage that the two control loops can each be readily proportioned in such a manner that the noise which may be present on the control signals is suppressed so that a considerable improvement is achieved in case of very unfavourable signal-to-noise ratios.

Finally it may be noted that the scope of the invention is not limited to the embodiment shown in FIGS. 2 and 3, in which the reference level applied to the comparison devices 17 and 18 is derived from a source of fixed potential 15 and in which the direct voltage level of the incoming signal is restored with the aid of the controllable direct voltage source 14 and the combination device 12 in such a manner that the direct voltage level of the incoming signal corresponds to the fixed reference level.

It is equally possible to derive the reference level applied to the comparison devices 17 and 18 from the controllable direct voltage source 14, which reference level is then controlled in a manner such that it corresponds to the varying direct voltage level of the incoming signal. In this embodiment the combination device 12 and the source of fixed potential 15 are superfluous.

What is claimed is:

1. A system for accurately reproducing pulse code modulated signals received at an unfavorable signal-to-noise ratio, comprising a controllable clock pulse generator, a first integrator, means for applying pulses from said generator in a given phase relationship to said integrator thereby to integrate said input signal over successive periods determined by the repetition rate of the clock pulse generator and at a given time phase position, a second integrator, means for applying pulses from said generator in a second phase relationship to said second integrator thereby to integrate said input signal over successive periods determined by the repetition rate of the clock pulse generator and at a second given time phase position different from that of the first integrator, a source of reference potential, first comparator means coupled to said source and to said first integrator for producing a first comparison signal, second comparator means coupled to said source and said second integrator for producing a second comparison signal, error detection means coupled to said first and second comparator means and actuated at the repetition rate of said clock pulse generator for producing a first control signal having a value determined by departures of said first and second integrated signals from the value of the said reference potential and a second control signal having a value as determined by phase variations of said first and second integrated signals relative to each other, a source of controllable potential, means for combining said controllable potential with said input signal, means for applying said first control signal to said controllable source to vary the value thereof and thereby to vary the level of said input signal, and means for applying said second control signal to said clock pulse generator thereby to vary the repetition rate thereof in a sense coincident with the pulse repetition rate of said incoming signal.

2. A system as claimed in claim 1, in which the phase of the clock pulses applied to said first integrator produces an integration period substantially coinciding with successive bit periods of the incoming signal, and the phase of the clock pulses applied to said second integrator produces an integration period equal to one bit perod of the incoming signal and is shifted over half a bit period relative to the integration period of the first integrator.

3. A system as claimed in claim 1, wherein said error detection means comprises a first and a second register connected to said comparator means, one register being controlled by clock pulses applied to the first integrator and the other register being controlled by clock pulses applied to the second integrator, signal values of either "1" and "0" or "0" and "1" being registered in these registers as determined by the polarity of the difference signal which occurs at the registering instants at the outputs of said comparator means.

4. A system as claimed in claim 3, wherein said error detection means further comprises a first "exclusive OR" circuit to which either the "1" and "0" or "0" and "1" values of the first register on the one hand are applied through direct connections and on the other hand through circuits introducing a fixed delay Δ, whereby the output pulses occurring at the output of said "exclusive OR" circuit have a duration equal to the introduced delay Δ and are representative of a transition in the input signal.

5. A system as claimed in claim 4, further comprising a third register for storing the "1" and "0" or "0" and "1" values of the first register at the instant of occurrence of clock pulses derived from said clock pulse generator, and means for applying activating clock pulses having a phase shift angle Δ relative to the clock pulses applied to the first integrator.

6. A system as claimed in claim 1, characterized in that the said error detection means comprises an error discriminator which utilizes as a criterion for distinguishing between phase error and direct voltage level error the fact that in the case of a direct voltage level error the polarity of the difference signal occurring at the output of the second comparison device remains equal at successive registering instances, whereas in the case of a phase error the difference signal changes at successive registering instants.

7. A system as claimed in claim 1, wherein said error detection means comprises four AND gates, a first register connected to said first comparator means and actuated with clock pulses in the phase of the clock pulses applied to said first integrator, a second register conected to the output of said first register and actuated by clock pulses phase displaced with reference to the above-mentioned clock pulses, means for producing transition pulses comprising an exclusive OR circuit energized by the outputs of said first and second registers, means for applying said transition pulses to said AND gates, a third register connected to said second integrator, two of said four AND gates being directly controlled by the output signals of the third register, a fourth register energized by said first register, second and third exclusive OR gates energized by said third and fourth registers, and means coupling the outputs of said third and fourth OR gates to the remaining two of said AND gates.

References Cited

UNITED STATES PATENTS

| | | | |
|---|---|---|---|
| 3,629,716 | 12/1971 | Dimon | 325—419 |
| 3,557,308 | 1/1971 | Alexander | 328—155 |
| 3,509,279 | 4/1970 | Martin et al. | 325—326 |

ALBERT MAYEN, Primary Examiner

J. MEYER, Assistant Examiner

U.S. Cl. X.R.

325—326, 474, 476; 328—71, 72, 78, 118, 127, 155; 329—104, 105